United States Patent
Umemura et al.

(10) Patent No.: US 8,567,818 B2
(45) Date of Patent: Oct. 29, 2013

(54) VIBRATION DAMPING STRUCTURE FOR STEERING WHEEL

(75) Inventors: Norio Umemura, Kiyosu (JP); Tsutomu Ishii, Kiyosu (JP); Kosuke Shigeta, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 13/600,307

(22) Filed: Aug. 31, 2012

(65) Prior Publication Data

US 2013/0069350 A1    Mar. 21, 2013

(30) Foreign Application Priority Data

Sep. 21, 2011  (JP) ................................. 2011-206269
Mar. 30, 2012  (JP) ................................. 2012-078737

(51) Int. Cl.
*B60R 21/203*    (2006.01)

(52) U.S. Cl.
USPC ...................................... 280/731; 280/728.2

(58) Field of Classification Search
USPC ................ 280/731, 728.2; 200/61.54, 61.55; 267/136, 140.3, 140.4, 140.5, 153; 188/379, 380, 378
See application file for complete search history.

(56) References Cited

U.S. PATENT DOCUMENTS

| | | | | |
|---|---|---|---|---|
| 5,505,483 A * | 4/1996 | Taguchi et al. | ............ | 280/728.2 |
| 5,634,658 A * | 6/1997 | Adams | ........................ | 280/728.2 |
| 5,683,100 A * | 11/1997 | Enders | ........................ | 280/728.2 |
| 5,836,608 A * | 11/1998 | Soderquist et al. | ......... | 280/728.2 |
| 5,860,672 A * | 1/1999 | Petersen | ..................... | 280/728.2 |
| 6,149,192 A * | 11/2000 | Swann et al. | .................. | 280/740 |
| 6,702,318 B2 * | 3/2004 | Rose et al. | ................... | 280/728.2 |
| 6,752,415 B2 * | 6/2004 | Nelson et al. | ............... | 280/728.2 |
| 6,758,489 B2 * | 7/2004 | Xu | ............... | 280/728.1 |
| 6,854,760 B2 * | 2/2005 | Whited et al. | ................. | 280/732 |
| 7,311,324 B2 * | 12/2007 | Okada et al. | ............... | 280/728.2 |
| 7,926,837 B2 * | 4/2011 | Harvey et al. | .............. | 280/728.2 |
| 8,286,766 B2 * | 10/2012 | Terada et al. | .................. | 188/379 |
| 2006/0061068 A1 * | 3/2006 | Nash et al. | .................. | 280/728.2 |

FOREIGN PATENT DOCUMENTS

JP    A-2006-096127    4/2006

* cited by examiner

*Primary Examiner* — Drew Brown
(74) *Attorney, Agent, or Firm* — Posz Law Group, PLC

(57) ABSTRACT

A vibration damping structure for a steering wheel includes an airbag mounted in the steering wheel, an inflator arranged forward of the airbag, and a support member elastically supporting the inflator at a position forward of the inflator. The inflator includes a peripheral wall portion and gas ports formed in the wall portion. The support member has a hole facing the inflator. A sealing portion is provided to surround the hole. Through contact between the inflator and the support member at the sealing portion, gas leakage via the hole is prevented. The inflator has a pressure receiving portion in the vicinity of the gas ports to change the flow direction of gas, which is discharged outward from the gas ports in the radial direction of the wall portion, to a direction toward a rear side. The pressure receiving portion produces force acting forward by receiving pressure from the gas.

9 Claims, 7 Drawing Sheets

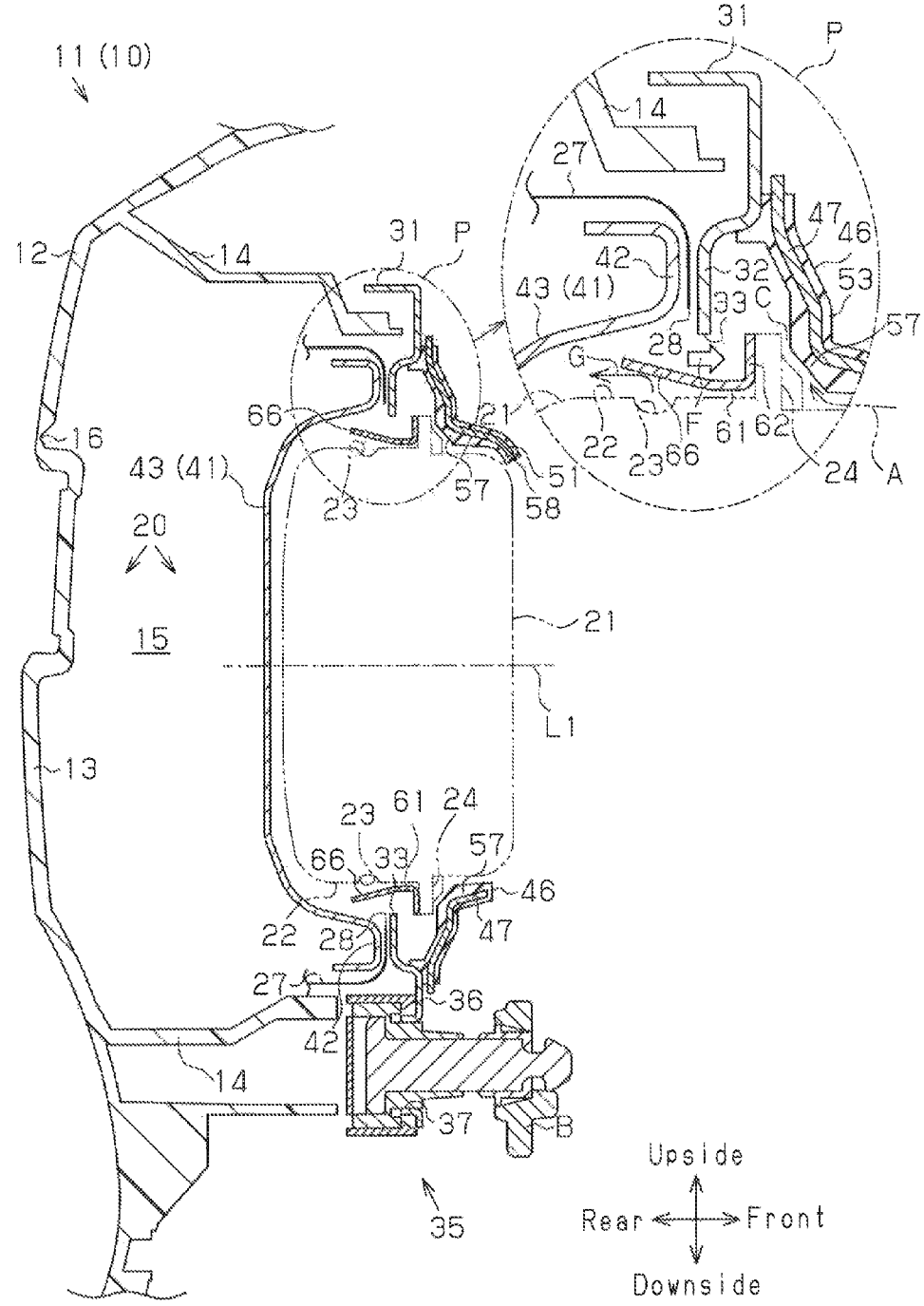

Fig.4A   Fig.4B

VIBRATION DAMPING STRUCTURE FOR STEERING WHEEL

BACKGROUND OF THE INVENTION

The present invention relates to a vibration damping structure that is used in a steering apparatus of a vehicle to damp vibration of a steering wheel having an airbag device.

Vibration of a steering wheel in a vertical direction and a left-right direction, which may occur when the vehicle travels at a high speed or the engine of the vehicle idles, decreases driving comfort. Techniques for damping such vibration of the steering wheel thus nave been developed and proposed. One such technique employs a dynamic damper. The dynamic damper is configured by a weight acting as a damper mass and an elastic member for supporting the weight with respect to a component such as a metal core of a steering wheel. In this technique, the dynamic damper, which is attached to the steering wheel, receives vibration from the steering wheel at a frequency close or equal to the natural frequency of the dynamic damper. This causes the dynamic damper to resonate, thus absorbing vibration energy from the steering wheel. As a result, the vibration of the steering wheel is damped.

An airbag device is mounted in the pad of the steering wheel to protect the driver in a car crash. The airbag device includes an airbag and an inflator for supplying gas to the airbag. When a car crash happens, the airbag device sends gas from the inflator to the airbag to inflate the airbag rearward, thus protecting the driver from impact.

However, since a large space is necessary to install the airbag device in the interior of the steering wheel, it is difficult to mount the aforementioned dynamic damper in recent steering wheels.

To solve this problem, one proposed vibration damping structure for a steering wheel includes an inflator of an airbag device functioning as a damper mass of a dynamic damper (see, for example, Japanese Laid-Open Patent Publication No. 2006-96127). Specifically, the inflator of the steering wheel includes a cylindrical peripheral wall portion and gas ports formed in the peripheral wall portion. By discharging gas outward from the gas ports in a radial direction of the peripheral wall portion, the inflator inflates the airbag rearward. A support member having an elastic support portion for elastically supporting the inflator is arranged in front of the inflator. The inflator thus functions as the damper mass of the dynamic damper and the elastic support portion functions as a spring in the dynamic damper.

A communication hole is formed in the support member at a position facing the inflator. Annular sealing portions are arranged in the inflator and the support member at positions surrounding the communication hole. The inflator thus contacts the support member through the sealing portions, thus restricting gas leakage through the communication hole.

In the steering wheel described in Japanese Laid-open Patent Publication No. 2006-96127, the inflator is prevented from contacting the support member through the sealing portions when the airbag is not inflated. If the dynamic damper receives (the inflator and the elastic support portion receive) vibration from the steering wheel at a frequency close or equal to the natural frequency of the dynamic damper, the elastic support portion elastically deforms and vibrates together with the inflator. The dynamic damper thus absorbs vibration energy from the steering wheel and damps vibration of the steering wheel.

When the vehicle receives impact, gas is discharged outward from the gas ports, which is formed in the peripheral wall portion of the inflator, in the radial direction of the peripheral wall portion. The gas is thus fed into the airbag to inflate the airbag. This increases the pressure in the airbag, thus applying force acting forward of the inflator. The force causes the inflator to elastically deform the elastic support portion and move forward, thus contacting the support member through the sealing portions. This seals the space between the inflator and the support member, thus preventing gas leakage through the communication hole.

However, in the steering wheel described in Japanese Laid-Open Patent Publication No. 2006-96127, prevention of gas leakage from the communication hole is brought about only after the airbag is inflated to a certain extent. Specifically, the force acting forward is applied to the inflator only after the pressure in the airbag rises to a certain level. As a result, the space between the inflator and the support member is maintained unsealed in the period from when the gas starts being discharged from the inflator to when the pressure in the airbag rises to the certain level. This may cause leakage of the gas through the communication hole.

SUMMARY OF THE INVENTION

Accordingly, it is an objective of the present invention to provide a vibration damping structure for a steering wheel that allows early accomplishment of prevention of gas leakage through a communication hole after gas starts being discharged from an inflator.

To achieve the foregoing objective, and in accordance with one aspect of the present invention, a vibration damping structure for a steering wheel using a dynamic damper is provided. The vibration damping structure has an airbag mounted in the steering wheel, an inflator arranged forward of the airbag, a support member, and a sealing portion. The inflator has a peripheral wall portion and a plurality of gas ports formed in the peripheral wall portion. The inflator discharges gas from the gas ports outward in a radial direction of the peripheral wall portion to inflate the airbag rearward. The inflator functions as a damper mass in the dynamic damper. The support member has an elastic support portion for elastically supporting the inflator at a position forward of the inflator. The support member has a communication hole formed at a position facing the inflator. The elastic support portion functions as a spring in the dynamic damper. The sealing portion is formed in at least one of the inflator and the support member to surround the communication hole. The inflator contacts the support member at the sealing portion so that gas leakage via the communication hole is prevented. A pressure receiving portion is joined integrally with the inflator at a position close to the gas ports of the inflator. The pressure receiving portion changes a flow direction of the gas discharged outward from the gas ports in the radial direction of the peripheral wall portion to a direction toward a rear side and to produce force acting forward by receiving pressure from the gas.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3A is a cross-sectional view taken along line 3A-3A of FIG. 1, showing a portion of the steering wheel;

FIG. 3B is an enlarged cross-sectional view showing the portion P illustrated in FIG. 3A;

FIG. 4A is a cross-sectional view taken along line 4A-4A of FIG. 1, showing a portion of the steering wheel;

FIG. 4B is an enlarged cross-sectional view showing the portion Q illustrated in FIG. 4A;

Figure 1:
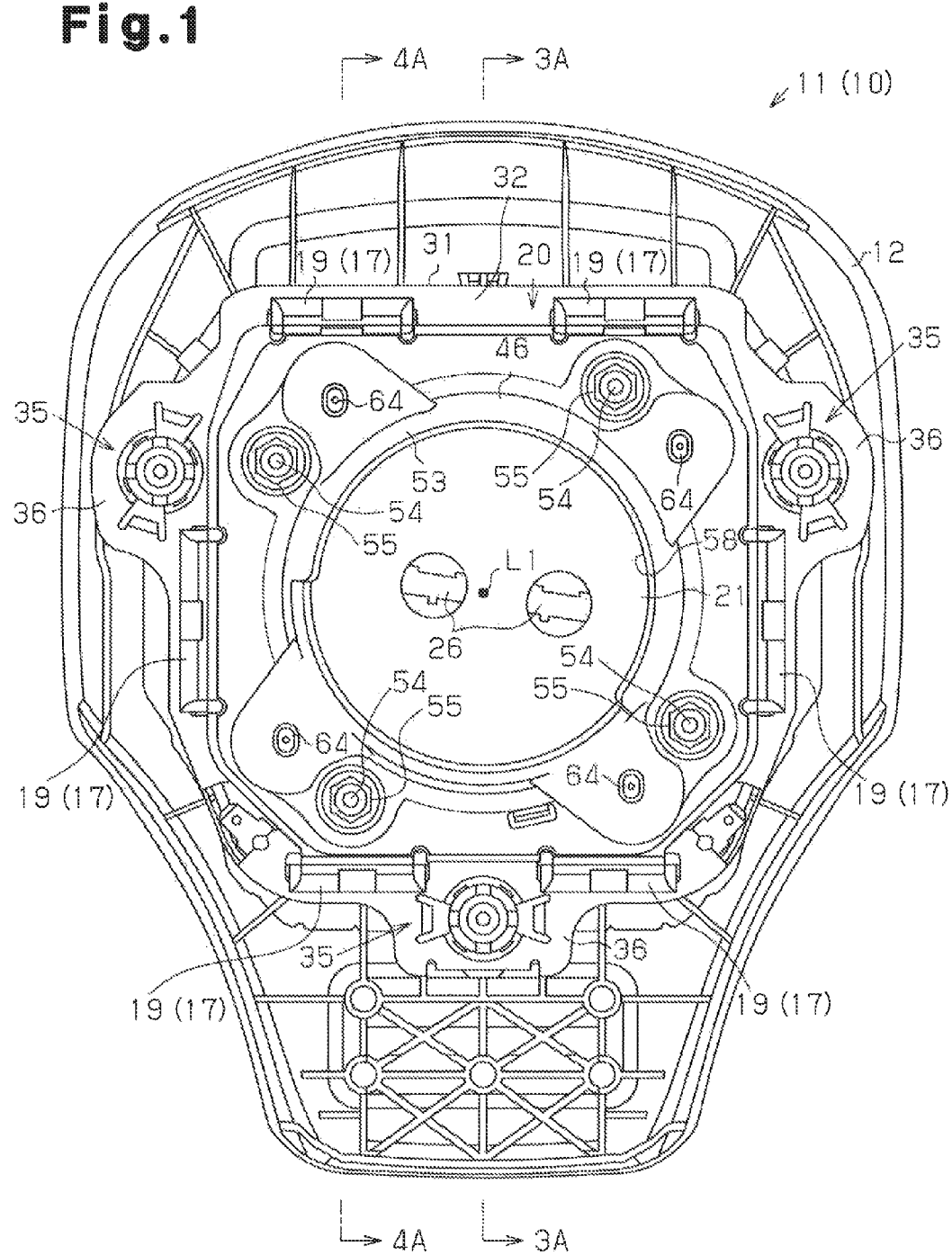
FIG. 1 is a diagram showing a first embodiment of the present invention, which is a rear view showing a portion of a steering wheel in which an airbag device is mounted.

DETAILED DESCRIPTION OF THE PREFERRED EMBODIMENTS (First Embodiment)

A first embodiment of the present invention, which is a vibration damping structure for a steering wheel of a vehicle, will now be described with reference to FIGS. 1 to 4.

As shown in FIGS. 3A to 4B, a pad portion 11, which is a portion of a steering wheel 10, includes a pad cover 12 and a lower cover (not shown). The pad cover 12 is arranged at the side facing the driver (left as viewed in FIGS. 3A to 4B) and the lower cover is located forward of the pad cover 12.

A metal core B, which is formed of iron, aluminum, magnesium, or alloy of these metals, is mounted in the steering wheel 10. The metal core B is a framework of the steering wheel 10. FIG. 3A shows a portion of the metal core B.

An airbag device 20, in addition to the metal core B, is installed in the interior of the pad portion 11, which is the space surrounded by the pad cover 12 and the lower cover. The airbag device 20 has a vibration damping structure for damping vibration of the steering wheel 10.

When the vehicle receives impact from front due to, for example, a frontal collision, the airbag device 20 inflates an airbag 27 at a position forward of the driver, thus relieving impact on the driver. Specifically, the airbag device 20 supplies gas G from the inflator (a gas generator) 21 to the airbag 27 to inflate the airbag 27.

The airbag device 20 includes a back holder 31, a cup retainer 41, a support member 46, and a gas plate 61, additionally to the pad cover 12, the inflator 21, and the airbag 27, which nave been described. The pad cover 12 is a common component to the steering wheel 10 (the pad portion 11) and the airbag device 20. Hereinafter, the components of the airbag device 20 will be described.

<Pad Cover 12>

The pad cover 12 has a lid portion 13 and a substantially rectangular frame-like accommodating wall portion 14, which projects forward from the lid portion 13. The pad cover 12 as a whole is formed of synthetic plastic. The lid portion 13 and the accommodating wall portion 14 form an accommodation space 15 with respect to the back holder 31. A breakable portion 16 with low strength is formed on a front surface of the lid portion 13. The thickness of the breakable portion 16 is smaller than the thickness of the rest of the lid portion 13. The breakable portion 16 is configured to breakable in the lid portion 13 when the airbag 27 is deployed and inflated.

Figures 4A, 4B:
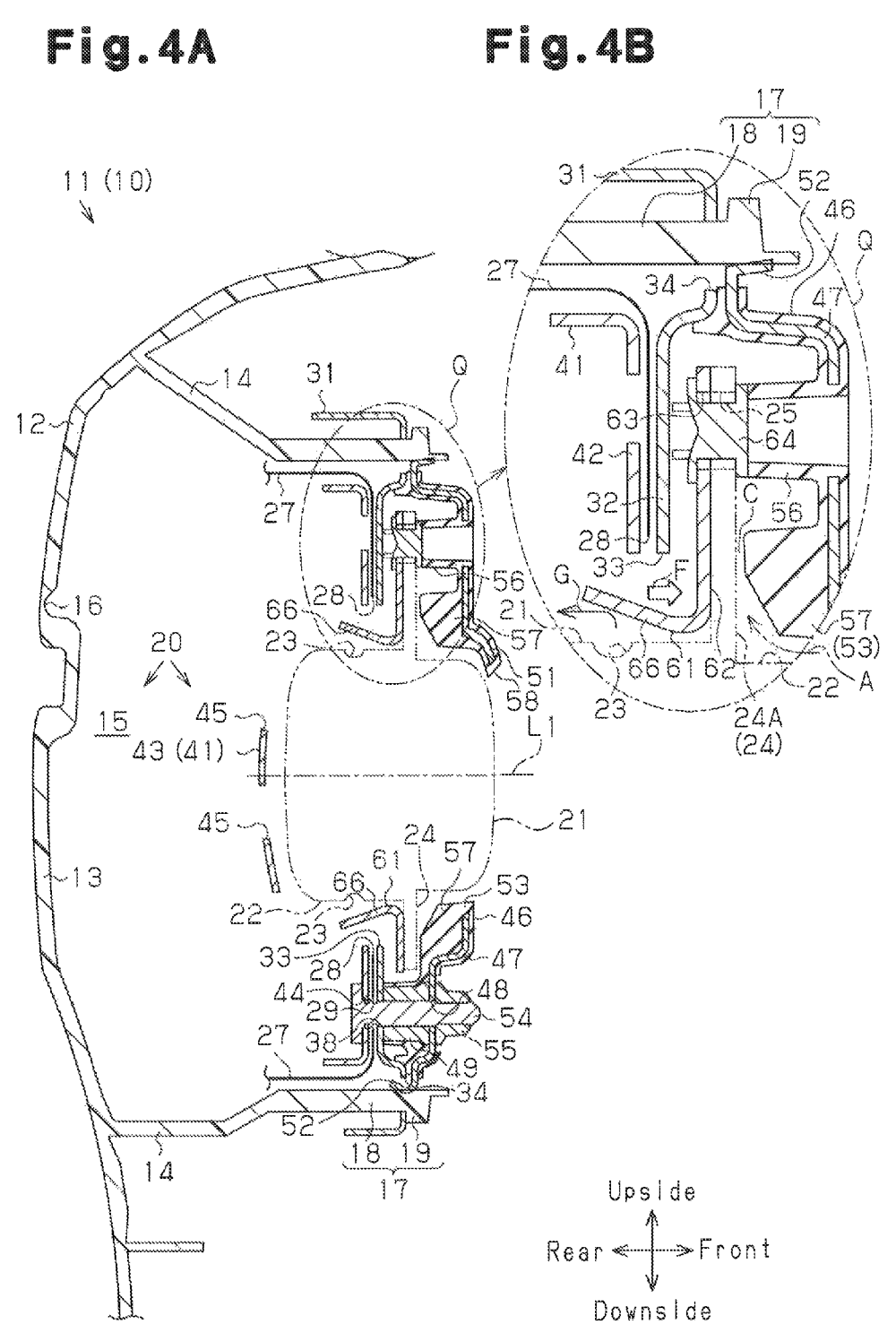

With reference to FIGS. 1, 4A and 4B, the accommodating wall portion 14 includes a plurality of engagement claws 17, which are formed integrally with the accommodating wall portion 14 and arranged at corresponding (six) positions in a front end portion of the accommodating wall portion 14. Each of the engagement claws 17 has a rectangular plate-like body portion 18 and a claw portion 19, which is formed in a front portion of the body portion 18 and projects separately from the accommodation space 15.

<Inflator 21>

With reference to FIGS. 3A to 4B, the outer peripheral portion of the inflator 21 is configured by the substantially cylindrical peripheral wall portion 22, which extends about the axis L1 extending in a forward-rearward direction. A gas generating agent (not shown) is accommodated in the peripheral wall portion 22 to generate gas G to inflate the airbag 27. The peripheral wall portion 22 has a plurality of gas ports 23, which are arranged circumferentially and spaced apart at substantially equal angular intervals. The gas G, which is generated by the gas generating agent, is discharged outward from the gas pores 23 in the radial direction of the peripheral wall portion 22.

An annular flange 24, which extends radially outward along the entire circumference of the peripheral wall portion 22, is formed on the peripheral wall portion 22 at a position forward of the gas ports 23. The flange 24 has a substantially flat plate-like shape and extends perpendicular to the axis L1 of the inflator 21. The flange 24 includes a plurality of attachment pieces 24A, which are formed integrally with the flange 24 at corresponding (four) positions. The attachment pieces 24A project outward in the radial direction of the peripheral wall portion 22, compared to the rest of the flange 24 (see FIG. 4B). A fastening insertion hole 25 is formed in each of the attachment pieces 24A and extends through the attachment piece 24A in the forward-rearward direction.

As illustrated in FIG. 1, a pair of connectors 26 is joined to a front portion of the inflator 21. A plurality of harnesses (not shown), each of which serves as a cable for inputting operating signals to the inflator 21, are connected to each of the connectors 26.

Alternatively, the inflator 21 employing the aforementioned gas generating agent may be replaced by an inflator that discharges gas by rupturing a partition wall of a gas cylinder filled with pressurized gas using explosive.

<Airbag 27>

With reference to FIGS. 3A to 4B, the airbag 27 is inflated by the gas G supplied by the inflator 21. The airbag 27 is formed in a bag-like shape using a high-strength and flexible fabric such as woven cloth. The airbag 27 is sized such that the airbag 27 can inflate in the range between the steering wheel 10 and the driver. The airbag 27 has a gas inlet port 28, which is formed in a front end portion of the airbag 27. The gas inlet port 28 introduces the gas G, which has been discharged from the gas ports 23, into the airbag 27. A plurality of bolt insertion holes 29 are formed in the airbag 27 at corresponding (four) positions in the vicinity of the gas inlet port 28 (see FIG. 4A). Most portion of the airbag 27, other than the gas inlet port 28, is folded in a compact shape and arranged in the accommodation space 15, although not illustrated.

<Back Holder 31>

Figure 2:
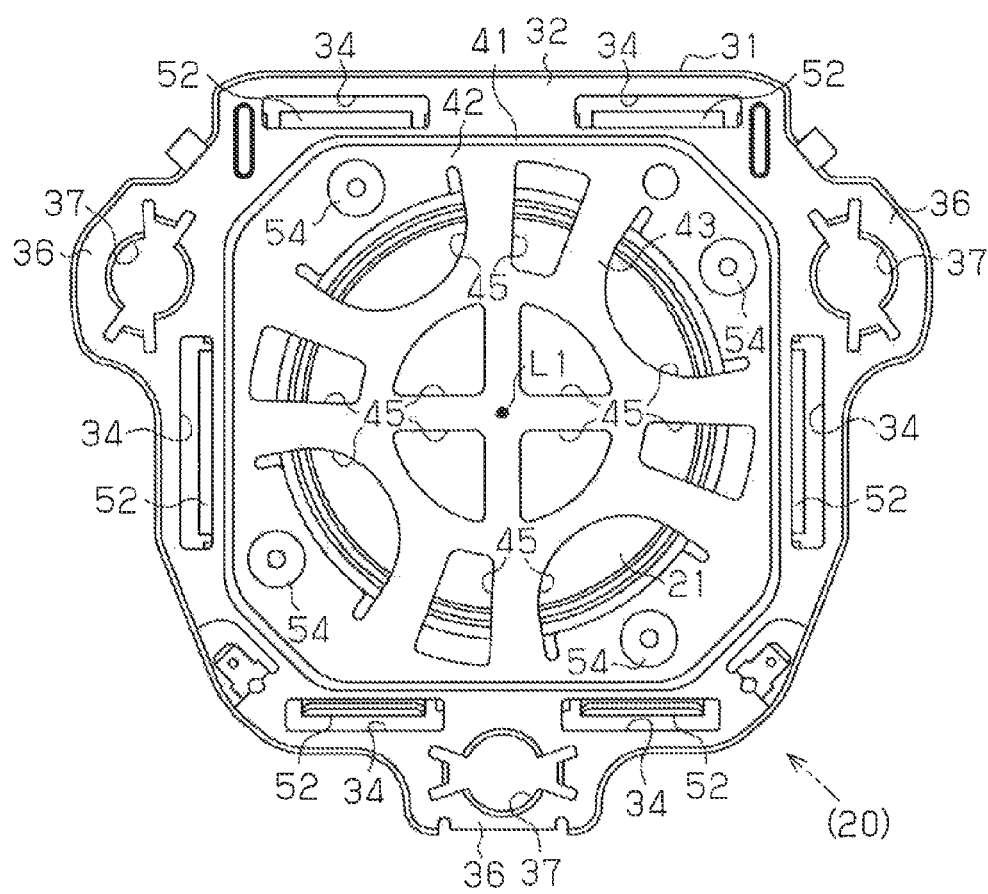
FIG. 2 is a front view showing some of the components (including a back holder, a cup retainer, and an inflator) of the airbag device of the first embodiment.

As illustrated in FIGS. 2 to 4, the back holder 31 is formed by pressing a metal plate. A main portion of the back holder 31 is configured by a base 32. The base 32 has a substantially flat plate-like shape and extends perpendicular to the axis L1 of the inflator 21. The base 32 is located forward of the gas inlet port 28 of the airbag 27. The base 32 has a frame-like shape having a substantially rectangular outline. A circular insertion hole 33 is formed at the center of the base 32. The diameter of the insertion hole 33 is slightly greater than the diameter of the peripheral wall portion 22 of the inflator 21.

Engagement holes 34 are formed in the base 32 at a plurality of (six) positions corresponding to the engagement claws 17 of the pad cover 12. Each of the engagement holes 34 is formed in a slit-like shape and extends in an elongated shape along the outer edge of the base 32 in correspondence with the wide shape of the corresponding engagement claw 17. Each engagement claw 17 is inserted into the corresponding engagement hole 34 from the rear side. The engagement claw 17 has a claw portion 19, which extends outward of the corresponding engagement hole 34 in the radial direction of the peripheral wall portion 22 and arranged at a position forward of the base 32. The engagement claws 17 are thus engaged with the base 32 such that the pad cover 12 is prevented from displacing rearward with respect to the base 32.

With reference to FIGS. 1 and 3A, attachment portions 36, each of which is used to attach a horn switch mechanism 35, are formed in the base 32 at corresponding (three) portions. Each of the attachment portions 36 projects outward in the radial direction of the peripheral wall portion 22. The horn switch mechanisms 35 are employed to operate a horn device (not shown), which is mounted in the vehicle. An attachment hole 37 for attaching each horn switch mechanism 35 is formed in the corresponding attachment portion 36 and extends through the attachment portion 36 along the axis L1 (see FIG. 3A). The horn switch mechanisms 35 attached to the corresponding attachment portions 36 are supported by the metal core 3 (see FIG. 3A). As a result, the airbag device 20 is supported by the metal core B through the horn switch mechanisms 35. The airbag device 20 is held in a floating state with respect to the metal core B and moved in the forward-rearward direction through deformation of the horn switch mechanisms 35.

Bolt insertion holes 38 are formed in the base 32 at corresponding (four) positrons between the attachment holes 37 and the corresponding engagement hole 34 and the insertion hole 33 (see FIG. 4A).

<Cup Retainer>

As illustrated in FIGS. 2 to 4B, the cup retainer 41 is formed by pressing a metal plate. The cup retainer 41 has an annular attachment base 42 and a cover portion 43, which extends rearward from an inner edge of the attachment base 42 to cover a rear portion of the inflator 21.

The attachment base 42 has a substantially flat plate-like shape and extends perpendicular to the axis L1 of the inflator 21. The attachment base 42 is located rearward of the gas inlet port 28 of the airbag 27 and arranged at a position outward of the gas ports 23 in the radial direction of the peripheral wall portion 22. Bolt insertion holes 44 are formed in the attachment base 42 at positions corresponding to the bolt insertion holes 38 of the back holder 31 (see FIG. 4A). A plurality of gas outlet ports 45 for releasing the gas G discharged from the inflator 21 from the cup retainer 41 into the airbag 27 are formed in the cover portion 43.

<Support Member 46>

Referring to FIGS. 1 and 3A to 4B, the support member 46 elastically supports the inflator 21 with respect to the back holder 31. A communication hole 58 is formed in a middle portion of the support member 46 and extends through the support member 46 along the axis L1. The harnesses connected to the connectors 26 of the inflator 21 are passed through the communication hole 58 and each extended out to a position forward of the support member 46.

The framework of the support member 46 is configured by a support plate portion 47. Most portion of the support member 46 is arranged forward of the back holder 31. The support plate portion 47 is formed by pressing a metal plate.

Bolt insertion holes 48 are formed in the support plate portion 47 at positions corresponding to the bolt insertion holes 38 of the back holder 31 (see FIG. 4A). Collars (cylindrical spacers) 49 coaxial with the corresponding bolt insertion holes 48 are arranged rearward of the support plate portion 47 at positions corresponding to the bolt insertion holes 48. Each of the collars 49 forms a portion of the support member 46. Each collar 49 is covered by an elastic portion 53, which will be described below, together with the support plate portion 47 and thus connected integrally with the support plate portion 47.

The support plate portion 47 has a cover portion 51, which is formed in a middle portion of the support plate portion 47 and projects forward. The cover portion 51 covers a front outer peripheral portion of the inflator 21 while held in a state spaced from the inflator 21.

The support plate portion 47 has a plurality of holding portions 52 (the number of which is equal to the number of the engagement holes 34), which are formed at positions corresponding to the engagement holes 34 of the back holder 31 and extend forward or rearward from an outer edge of the support plate portion 47. Each of the holding portions 52 elastically contacts the corresponding one of the engagement claws 17 from an inner side in the radial direction of the peripheral wall portion 22. Each holding portion 52 prevents the corresponding engagement claw 17 from flexing inward in the radial direction of the peripheral wall portion 22, thus maintaining the claw portion 19 or the engagement claw 17 in a state engaged with wails of the engagement hole 34.

The support plate portion 47 has the functions described below, in addition to the above-described functions.

(i) The support plate portion 47 operates to prevent the inflator 21 from moving excessively forward.

(ii) The support plate portion 47 prevents the harnesses, which are arranged forward of the inflator 21, from contacting the inflator 21. In this manner, the support plate portion 47 operates to prevent the harnesses from hampering vibration of the inflator 21.

A majority of the support plate portion 47 other than the holding portions 52 is covered by the elastic portion 53, which is formed of elastic material such as synthetic rubber or elastomer. The elastic portion 53 covers the cover portion 51 and restricts contact between the inflator 21 and the support plate portion 47, thus preventing noise from being generated by such contact. The elastic portion 53 also covers the collars 49.

A portion of the airbag 27 in the vicinity of the gas inlet port 28 is arranged between the base 32 of the back holder 31 and the attachment base 42 of the cup retainer 41. Specifically, the portion of the airbag 27 in the vicinity of the gas inlet port 28 is arranged such that the bolt insertion holes 38 of the back holder 31, the bolt insertion holes 44 of the cup retainer 41, and the bolt insertion holes 29 of the airbag 27 are located at corresponding positions. In other words, the portion of the airbag 27 in the vicinity of the gas inlet port 28 is clamped between the back holder 31 and the cup retainer 41 from a front side and a rear side with the bolt insertion holes 29 of the airbag 27 and the bolt insertion holes 38, 44 located at corresponding positions.

The support member 46 is arranged forward of the base 32 such that the positions of the bolt insertion holes 38 of the back holder 31 correspond to the positions of the bolt insertion holes 48 of the support plate portion 47. In this state, each collar 49 is located between the corresponding bolt insertion hole 38 of the back holder 31 and the associated bolt insertion hole 48 of the support plate portion 47. The collars 49 maintain the support plate portion 47 in a state spaced forward from the back holder 31 by a certain distance.

Bolts 54 are passed through the bolt insertion holes 44, 29, 38 of the cup retainer 41, the airbag 27, and the back holder 31, the collars 49, and the bolt insertion holes 48 of the support plate portion 47 from behind the cup retainer 41. Nuts 55 are fastened to the corresponding bolts 54, which project forward from the support plate portion 47 (see FIG. 1). By fastening the nuts 55, the cup retainer 41 and the support member 46 are fastened to the back holder 31 and the portion of the airbag 27 in the vicinity of the gas inlet port 28 is clamped and fastened between the cup retainer 41 and the back holder 31.

As illustrated in FIGS. 4A and 4B, cylindrical elastic support portions 56, each of which extends rearward, are formed in the elastic portion 53 at corresponding (four) positions forward of the fastening insertion holes 25 of the inflator 21. Specifically, the elastic support portions 56 are formed integrally with the elastic portion 53. The elastic support portions 56, together with the above-described inflator 21, configure a dynamic damper. In the first embodiment, the elastic support portions 56 are configured to function each as a spring in the dynamic damper and the inflator 21 is configured to function as a damper mass.

By tuning parameters of each elastic support portion 56, such as the size, the radial thickness, and the forward-rearward length, the natural frequency of the dynamic damper is adjusted. The natural frequency of the dynamic damper is adjusted to a predetermined frequency of vibration to be damped out of frequencies of vibration of the steering wheel 10.

Referring to FIGS. 4A and 4B, the portion of the elastic portion 53 surrounding the communication hole 58 at a position forward of the flange 24 and inward of the elastic support portions 56 in the radial direction of the peripheral wall portion 22 configures an annular sealing portion 57. When the airbag 27 is not inflated, the sealing portion 57 is spaced slightly forward from the flange 24 and forms a small clearance C between the sealing portion 57 and the flange 24.

<Gas Plate 61>

A gas plate 61 is formed by pressing a metal plate in an annular shape. An attachment base 62, which is a component of the gas plate 61, has a substantially flat plate-like shape and extends perpendicular to the axis L1 of the inflator 21. The attachment base 62 is arranged rearward of the flange 24 and forward of the gas ports 23 of the inflator 21. Fastening insertion holes 63 are formed in the attachment base 62 at a plurality of (four) positions corresponding to the fastening insertion holes 25 of the flange 24.

The attachment base 62 oh the gas plate 61, together with the flange 24, is fastened to the elastic support portions 56. Specifically, a metal rivet 64 is fixed to a rear end surface of each elastic support portion 56 through, for example, vulcanizing adhesion. A rear portion of each of the rivets 64 has a tubular shape having an open rear end. Each rivet 64 is inserted from the front side into the corresponding fastening insertion hole 25 of the flange 24 and the associated fastening insertion hole 63 of the attachment base 62.

As represented by lines formed by a long dash alternating with two short dashes in FIG. 4B, the rear portion of each rivet 64 is exposed rearward from the attachment base 62 of the gas plate 61. The exposed portion of the rivet 64 is compressed (swaged), as represented by the corresponding solid lines in FIG. 4B, such that the diameter of the exposed portion of the rivet 64 becomes greater than the inner diameter of each of the fastening insertion holes 25, 63. This fixes each rivet 64 to the flange 24 and clamps the gas plate 61 (the attachment base 62) between the portions of the rivets 64 each having the increased diameter and the flange 24. In this manner, the inflator 21 having the flange 24, together with the gas plate 61, is fastened to the elastic support portions 56 through the rivets 64. The inflator 21 is elastically supported by the elastic support portions 56 with respect to the support member 46 and the back holder 31.

In the first embodiment, the gas place 61 is fastened to the elastic support portions 56 together with the flange 24 and thus fixed to the flange 24. However, the gas plate 61 may be fixed to the flange 24 at any suitable position other than the position where the gas plate 61 is fastened to the elastic support portions 55 of the flange 24.

The gas plate 61 has a pressure receiving portion 66, which extends between the gas ports 23 of the inflator 21 and the portion of the airbag 27 fixed to the back holder 31 (the portion of the airbag 27 in the vicinity of the gas inlet port 28). The pressure receiving portion 66 is configured to change the discharging direction of gas G, which is discharged outward from the gas ports 23 in the radial direction of the peripheral wall portion 22, to a direction toward the rear side. Also, the pressure receiving portion 66 receives pressure from the gas G and thus generates force F acting forward. The pressure receiving portion 66 is formed by bending a portion of the gas plate 61 rearward at an inner edge of the base 62. The pressure receiving portion 66 is inclined at a substantially uniform angle to become more spaced from the peripheral wall portion 22 toward the rear end of the pressure receiving portion 66.

The vibration damping structure for the steering wheel 10 of the first embodiment is configured in the above-described manner. Operation of the first embodiment, or operation of the vibration damping structure, particularly, will hereafter be described.

In the steering wheel 10 of the first embodiment, the back holder 31 moves forward integrally with the other components of the airbag device 20 as the pad cover 12, which is illustrated in FIGS. 3A to 4B, is pressed forward by the driver. Such movement activates the horn switch mechanisms 35, thus causing the horn device to make sound.

When the airbag device 20 is in a normal state where the vehicle is free from impact from front, the gas G is prevented from being discharged from the gas ports 23 of the inflator 21 and the airbag 27 is maintained in a folded state.

In the aforementioned normal state, high-speed operation of the vehicle or idling of the engine of the vehicle may cause vibration in the steering wheel 10 in a vertical direction and a left-right direction. Such vibration is transmitted to the inflator 21 through the back holder 31 and the elastic support portions 56 in the airbag device 20. In this state, the flange 24 of the inflator 21 is spaced from the sealing portion 57 of the support member 46 so that the clearance C is maintained between the flange 24 and the sealing portion 57. The clearance C allows the inflator 21 to vibrate (FIGS. 3A to 4B).

Since the inflator 21 is capable of vibrating, the inflator 21 functions as the damper mass of the dynamic damper in the airbag device 20. The elastic support portions 56 of the support member 46 function as the springs of the dynamic damper.

If the steering wheel 10 vibrates in the vertical direction at a frequency close or equal to the predetermined frequency of vibration to be damped, the elastic support portions 56 elastically deform and resonate in the vertical direction at the natural frequency, together with the inflator 21 and the pressure receiving portion 66 (the gas plate 61), which is formed integrally with the inflator 21. This absorbs vibration energy of the steering wheel 10 in the vertical direction. As a result, the vertical vibration of the steering wheel 10 is damped.

If the steering wheel 10 vibrates in the left-right direction at a frequency close or equal to the predetermined frequency of vibration to be damped, the elastic support portions 56 elastically deform and resonate in the left-right direction at the natural frequency, together with the inflator 21 and the pressure receiving portion 66 (the gas plate 61). This absorbs vibration energy of the steering wheel 10 in the left-right direction. As a result, the left-right vibration of the steering wheel 10 is damped.

As a result, in the first embodiment, vibration of the steering wheel 10 is damped in both the vertical direction and the left-right direction.

When the vehicle receives impact from front, the driver is to lean forward due to moment of inertia. At this stage, the inflator 21 of the airbag device 20 is actuated in response to the impact, thus discharging gas G outward from the gas ports 23 in the radial direction of the peripheral wall portion 22.

After having been discharged in the above-described manner, the gas G strikes the pressure receiving portion 66. The pressure receiving portion 66 is inclined to become more spaced from the peripheral wall portion 22 toward the rear end of the pressure receiving portion 66. The pressure receiving portion 66 thus changes the flow direction of the gas G, which is discharged outward in the radial direction of the peripheral wall portion 22, to the direction toward the rear side, as represented by the solid arrows in FIGS. 3B and 4B. The gas G flowing toward the rear side is supplied into the airbag 27. The gas G then unfolds (deploys) and inflates the airbag 27 rearward (toward the driver). The airbag 27 presses the lid portion 13 of the pad cover 12 when being deployed and inflated. Such deployment and inflation of the airbag 27 are restricted by the pad portion 11 until the lid portion 13 breakables at the breakable portion 16.

The pressure receiving portion 66 receives pressure from the gas G discharged from the gas ports 23. As a result, as represented by the blank arrows in FIGS. 3B and 4B, force F acting forward is produced in the pressure receiving portion 66. As a result, immediately after the gas G starts being discharged from the gas ports 23, the force F causes the inflator 21 to elastically deform the elastic support portions 55 and move forward to contact the sealing portion 57 of the support member 46. Such contact seals the space between the inflator 21 and the support member 46, thus preventing gas leakage from the communication hole 58.

In the first embodiment, the pressure receiving portion 66 is arranged at the position outward and close to the gas ports 23 in the radial direction of the peripheral wall portion 22. This arrangement decreases the interval between the gas ports 23 and the pressure receiving portion 66, allowing gas G to reach the pressure receiving portion 66 quickly after having been discharged from the gas ports 23. As a result, only a short time elapses after the gas G starts being discharged before the flow direction of the gas G is changed by the pressure receiving portion 66. This initiates inflation of the airbag 27 at an early stage. Also, the time period from when the gas G starts to blow to when the force F acting forward is produced in the pressure receiving portion 66 is short. This allows the inflator 21 to contact the sealing portion 57 of the support member 46 and be sealed at an early stage.

When the airbag 27 is inflated in the interior of the pad portion 11 (the space between the pad cover 12 and the lower cover), such inflation is restricted by the pad portion 11. This rapidly increases the pressure in the airbag 27 as the time elapses. Also, the force acting to move the inflator 21 forward is applied to the inflator 21. This force and the force F from the pressure receiving portion 66 cause firm contact between the inflator 21 and the sealing portion 57 of the support member 46. Specifically, the pressure in the airbag 27 becomes maximally high immediately before the airbag 27 bursts out of the pad portion 11.

The deployment and inflating airbag 27 increases the pressing force acting on the lid portion 13 of the pad cover 12, thus rupturing the breakable portion 16 of the lid portion 13. Then, the airbag 27 continuously is deployed and inflated rearward through the opening formed through such breakable. The airbag 27 is thus unfolded and inflated in the space between the driver, who is to lean forward due to the impact from front, and the steering wheel 10. As a result, movement of the driver is restricted by the airbag 27 and the driver is protected against the impact.

After the airbag 27 with the increased internal pressure breakables the lid portion 13 and bursts out from the pad cover 12, inflation of the airbag 27 is released from restriction by the pad portion 11. As a result, the airbag 27 is rapidly inflated and the pressure in the airbag 27 drops quickly to negative pressure (pressure lower than the atmospheric pressure).

Also in this state, the pressure of the gas G discharged from the gas ports 23 is received by the pressure receiving portion 66, which thus produces the force F acting forward. However, the force F is smaller than the force that is caused by the negative pressure and acts to move the inflator 21 rearward. Accordingly, the inflator 21 is moved rearward by the elastic restoring force of each elastic support portion 56. This temporarily separates the flange 24 from the sealing portion 57 of the support member 46, thus forming the clearance C between the flange 24 and the sealing portion 57.

However, the gas G discharged from the gas ports 23 continuously strikes the pressure receiving portion 66, which changes the flow direction of the gas G to the direction toward the rear side. Then, the gas G, which now flows toward the rear side, draws the air A from the exterior into the interior of the airbag 27 through the clearance C. This produces a stream of the air A moving from the exterior to the interior of the airbag 27 in the space C between the flange 24 and the sealing portion 57, as represented by the double-dotted chain arrows in FIGS. 3B and 4B. As a result, despite the fact that the interior and the exterior of the airbag 27 communicate with each other through the clearance C, the gas G in the airbag 27 is prevented from leaking from the communication hole 58 via the clearance C.

As the gas G is continuously supplied into the airbag 27, the pressure in the airbag 27 increases again. This increases the force acting to move the inflator 21 forward, thus causing the inflator 21 to contact the sealing portion 57 of the support member 46 again. Gas leakage from the communication hole 58 is thus prevented.

After having been discharged from the gas ports 23, the gas G flows outward in the radial direction of the peripheral wall portion 22, as has been described. Accordingly, if the pressure receiving portion 66 or any other obstacles that interfere with the flow of the gas G were not provided in the space between the peripheral wall portion 22 (the gas ports 23) and the portion of the airbag 27 fixed to the back holder 31 (the portion of the airbag 27 in the vicinity of the gas inlet port 28), the gas G discharged from the gas ports 23 would hit the portion of the airbag 27 fixed to the back holder 31, thus causing undesirable influence on this portion.

However, in the first embodiment, the gas G discharged from the gas ports 23 flows outward in the radial direction of the peripheral wall portion 22 but strikes the pressure receiving portion 66 before reaching the portion of the airbag 27 fixed to the back holder 31. This changes the flow direction of the gas G to the direction toward the rear side. As a result, the gas G discharged from the gas ports 23 is prevented from directly hitting the portion of the airbag 27 fixed to the back holder 31.

If the pressure receiving portion 66 were fixed to a component that does not move integrally with the inflator 21, such as the back holder 31, movement of the inflator 21 would change the position of each gas port 23 relative to the position of the pressure receiving portion 66. This may prevent the gas G discharged from the gas ports 23 from striking the pressure receiving portion 66 when the inflator 21 is located at a certain position. In this case, operation of the pressure receiving portion 66, which changes the flow direction of the gas G to the direction toward the rear side and produces the force F acting to move the inflator 21 forward, may not happen.

However, in the first embodiment, the pressure receiving portion 66 is formed integrally with the flange 24 of the inflator 21. Accordingly, regardless of the location of the inflator 21, the pressure receiving portion 66 is maintained constantly at the position outward and close to the gas ports 23 in the radial direction of the peripheral wall portion 22. As a result, the gas G discharged from the gas ports 23 hits the pressure receiving portion 66, regardless of where the inflator 21 is located. The pressure receiving portion 66 thus operates to change the flow direction of the gas G to the direction toward the rear side and produce the force F acting forward.

The first embodiment, which has been described in detail, has the advantages described below.

(1) The pressure receiving portion 66 is formed integrally with the inflator 21 (the flange 24) at the position close to the gas ports 23 of the inflator 21 (FIGS. 3A to 4B). The pressure receiving portion 66 operates to change the flow direction of the gas G, which is discharged outward from the gas ports 23 in the radial direction of the peripheral wall portion 22, to the direction toward the rear side. The pressure receiving portion 66 also operates to produce the force F acting forward by receiving pressure from the gas G.

Accordingly, regardless of the location of the inflator 21, the pressure receiving portion 66 is located constantly at the position close to the gas ports 23 and outward of the gas ports 23 in the radial direction of the peripheral wall portion 22. Also, since the pressure receiving portion 66 is close to the gas ports 23, the inflator 21 is moved forward at an early stage after the inflator 21 starts discharging the gas G. As a result, the inflator 21 moves and contacts the sealing portion 57 of the support member 46 early, thus accomplishing prevention of gas leakage from the communication hole 58 at an early stage.

(2) The pressure receiving portion 66 is arranged at the position close to the gas ports 23 and outward of the gas ports 23 in the radial direction of the peripheral wall portion 22 (FIGS. 3A to 4B).

This shortens the time from when discharging of the gas G is started to when the flow direction of the gas G is changed to the direction toward the rear side by the pressure receiving portion 66, thus allowing the airbag 27 to start inflating at an early stage. Also, the time from initiation of discharging of the gas G to production of the force F acting forward in the pressure receiving portion 66 is shortened. This accomplishes sealing early, thus ensuring the advantage of item (1) at a further early stage.

(3) The pressure receiving portion 66 is inclined to become more spaced from the peripheral wall portion 22 of the inflator 21 toward the rear end of the pressure receiving portion 66 (FIGS. 3A to 4B).

This allows the pressure receiving portion 66 to efficiently change the flow direction of the gas G discharged from the gas ports 23 to the direction toward the rear side. Also, since the pressure receiving portion 66 receives pressure from the gas G discharged from the gas ports 23, the force F acting forward is produced efficiently.

(4) The portion of the airbag 27 in the vicinity of the gas inlet port 28 is fixed to the back holder 31 at the position outward of the pressure receiving portion 66 in the radial direction of the peripheral wall portion 22 (FIG. 4A).

This arrangement prevents the portion of the airbag 27 fixed to the back holder 31 (the portion, of the airbag 27 in the vicinity of the gas inlet port 23) from being influenced by heat generated by the gas G discharged from the gas ports 23.

(Second Embodiment)

A second embodiment, of the present invention will now be described with reference to FIGS. 5 to 8.

Figure 5:
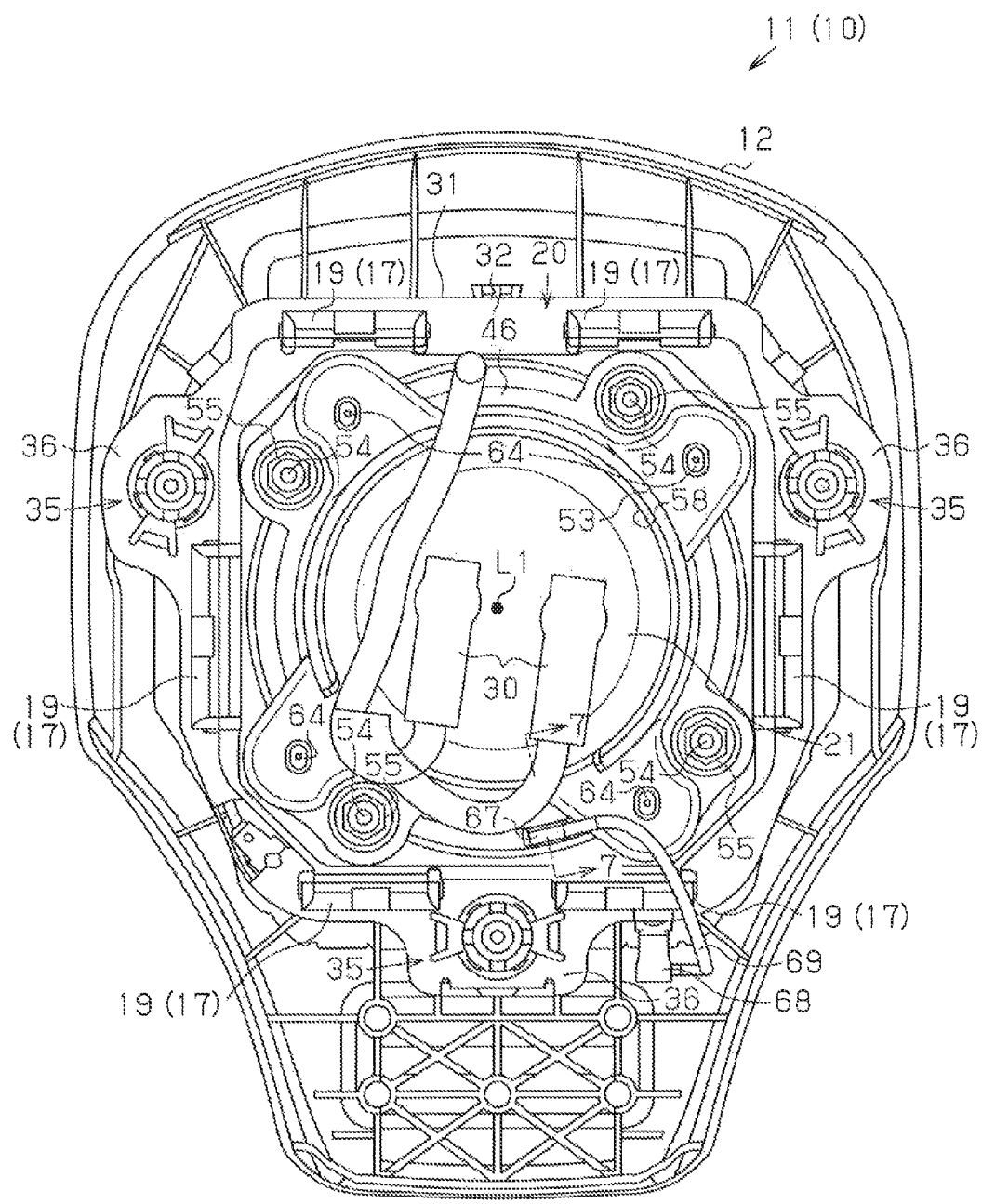
FIG. 5 is a diagram showing a second embodiment of the present invention, which is a rear view showing a portion of a steering wheel in which an airbag device is mounted.

As illustrated in FIG. 5, a harness 30, which is an input cable for operating signals to the inflator 21, is connected to the two connectors 26 of the inflator 21.

The configuration of the gas plate 61 of the second embodiment is slightly different from the configuration of the gas plate 61 of the first embodiment.

Figure 7:
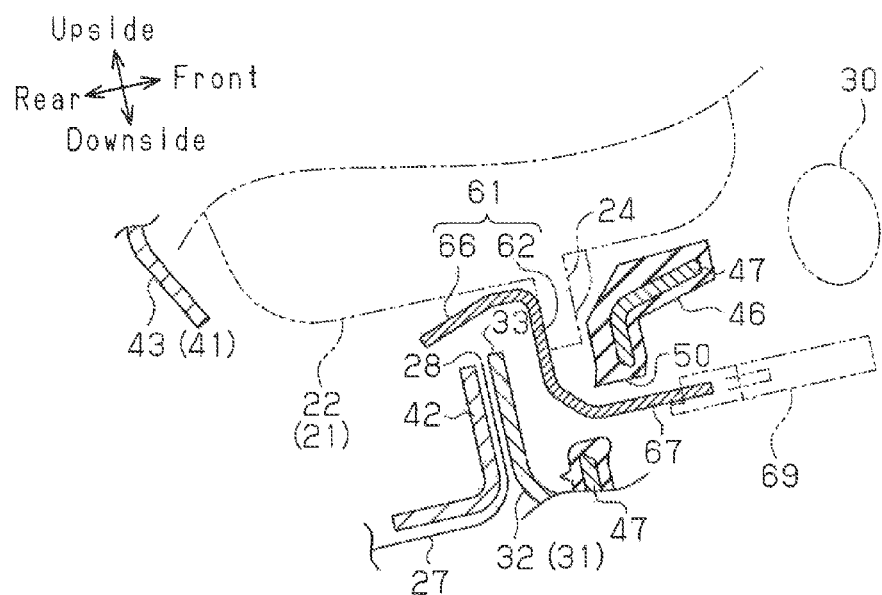
FIG. 7 is a cross-sectional view taken along line 7-7 of FIG. 5, showing a portion of the steering wheel.
Figure 8:
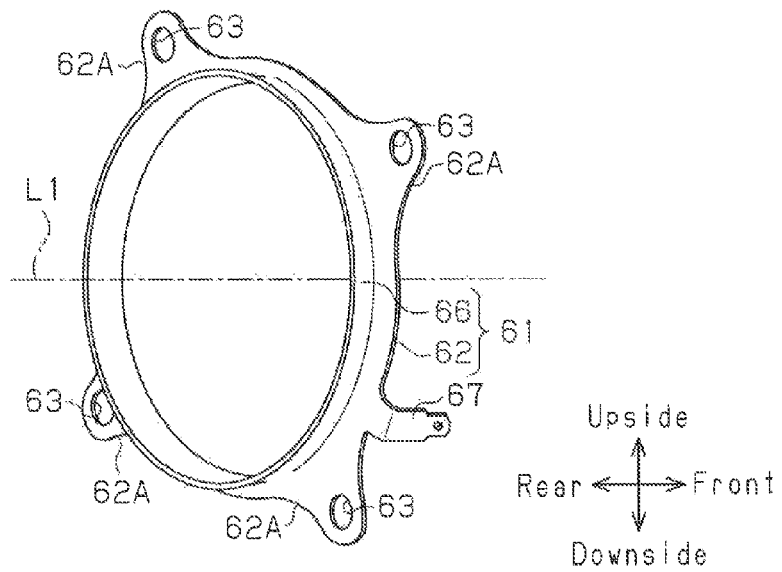
FIG. 8 is a perspective view as viewed from diagonally rearward, showing a gas plate having a ground terminal.

As illustrated in FIGS. 7 and 8, the gas plate 61 has the attachment base 62 and the pressure receiving portion 66 like the first embodiment. The attachment base 62 has an annular shape about the axis L1 of the inflator 21. The attachment base 62 has a substantially flat plate-like shape and extends perpendicular to the axis L1. Projections 62A, each of which projects outward in the radial direction of the peripheral wall portion 22, are formed in the attachment base 62 at a plurality of (four) circumferential positions. A fastening insertion hole 63 is formed in each of the projections 62A and extends through the projection 62A along the axis L1. Each projection 62A of the attachment base 62 of the gas plate 61 is fastened to the corresponding elastic support portion 56 through the rivet 64, together with the flange 24 (see FIG. 4B).

Each elastic support portion 56 is formed, of rubber, which is elastic insulating material. The gas plate 61 including the pressure receiving portion 66 as a whole is formed using a plate material of metal (a metal plate) that is conductive. The back holder 31 is also formed using a plate material of metal (a metal plate) that is conductive.

A ground terminal 67 is formed between an adjacent pair of the projections 62A in the attachment base 62 of the gas plate 61. In the second embodiment, the ground terminal 67 is located close to the specific one of the projections 62A in the circumferential direction of the attachment base 62. The ground terminal 67 is formed integrally with the gas plate 61 by bending a portion of the metal plate configuring the gas plate 61 in a forward direction.

Figure 6:
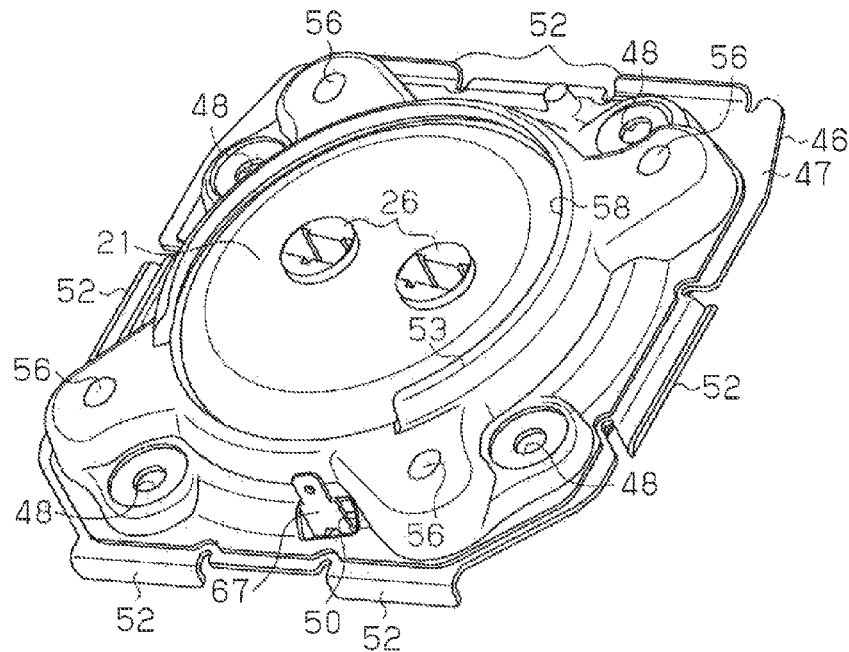
FIG. 6 is a perspective view as viewed from diagonally forward, showing some of the components (including a support member and an inflator) of the airbag device of the second embodiment.

With reference to FIGS. 6 and 7, a through hole 50 is formed in a middle portion of the support plate portion 47 of the support member 46 in the radial direction of the peripheral wall portion 22 and extends through the support plate portion 47 in the forward-rearward direction. The ground terminal 67 is passed through the through hole 50 from the rear side to the front side and exposed from the front surface of the steering wheel 10 (the support member 46).

As illustrated in FIG. 5, a ground terminal 68 is formed in the vicinity of the specific one of the attachment portions 36 of the back holder 31. The ground terminal 68 is arranged in the proximity of the ground terminal 67 of the gas plate 61. Located at this position, the ground terminal 68 is exposed from the front surface of the steering wheel 10.

As has been described for the first embodiment, the back holder 31 is supported by the metal core B of the steering wheel 10 through the horn switch mechanisms 35 (see FIG. 3A). The metal core B is connected to the body of the vehicle through, for example, a steering shaft (not shown). The ground terminal 67 of the gas plate 61 and the ground terminal 68 of the back holder 31 are connected to each other through a ground cable 69. The ground cable 69 configures a ground path, together with the ground terminal 68, the back holder 31, the metal core B, and she steering shaft. The ground path releases electric charge from the inflator 21. Through such configuration, the ground path is connected to the ground terminal 67 of the gas plate 61 through the ground cable 69.

The configurations of the components of the second embodiment other than the above-described components are identical to the configurations of the corresponding components of the first embodiment. Accordingly, the same or like reference numerals are given to these components that are the same as or like the corresponding components of the first embodiments and repeated description is omitted for the components.

Operation of the second embodiment, which is configured in the above-described manner, will hereafter be described.

As shown in FIG. 7, the ground terminal 67 is passed through the through hole 50 of the support member 46 from the rear side to the front side and exposed from the front surface of the steering wheel 10. The through hole 50 is formed in the middle portion of the support plate portion 47 of the support member 46 in the radial direction of the peripheral wall portion 22. This arrangement makes it unnecessary to extend the ground terminal 67 to the outer edge of the support plate portion 47. In this case, the dimension of the vibration damping structure for the steering wheel 10 in the aforementioned radial direction is decreased.

The ground terminal 67, which extends through the through hole 50, is exposed from the front surface of the steering wheel 10 (the support member 46). If the ground path (in this case, the ground cable 69) is connected to the ground terminal 67, the connected portion is also exposed from the steering wheel 10 (the support member 46). Such exposed portions are visible from the front side of the steering wheel 10.

In the steering wheel 10 having the vibration damping structure, the inflator 21 is elastically supported by the elastic support portions 56 formed of elastic insulating material (rubber) and thus insulated from conductive components. As a result, unlike a steering wheel without a vibration damping structure employing the elastic support portions 56, electric charge accumulates in the inflator 21 when the steering wheel 10 vibrates and causes friction in the inflator 21 with respect to the airbag 27 and the sealing portion 57. The electric charge produces static electricity, which may cause malfunction of the inflator 21.

In the second embodiment, the ground terminal 67 is arranged in the gas plate 61, which is formed of conductive material. The ground path is connected to the ground terminal 67. As a result, in the second embodiment, electric charge is released from the inflator 21 via the gas plate 61, the ground terminal 67, and the ground path.

Accordingly, the second embodiment has the advantages described below, in addition to the above-described advantages of items (1) to (4).

(5) The ground terminal 67 is formed in the gas plate 61 and the ground path for releasing electric charge from the inflator 21 is connected to the ground terminal 67 (FIGS. 5 and 7).

This prevents malfunction of the inflator 21 from being caused by the electric charge accumulated in the inflator 21 through vibration of the steering wheel 10.

The same advantage as the advantage of item (5) can be obtained by arranging a ground terminal directly in the inflator 21. However, in this case, machining on the inflator 21 is necessary. In contrast, in the second embodiment, the advantage is brought about without performing such machining on the inflator 21.

(6) The ground terminal 67 of the gas plate 61 is exposed from the front surface of the steering wheel 10 (the support member 46) (FIGS. 5 and 6).

Accordingly, by viewing the steering wheel 10 from front, the state of connection of the ground path (the ground cable 69) with respect to the ground terminal 67 is instantly made clear. This facilitates inspection on the state of connection of the ground cable 69 before shipment of the steering wheel 10.

(7) The ground terminal 68 of the back holder 31 is exposed from the front surface of the steering wheel 10 (FIG. 5).

This arrangement ensures the same advantage as the advantage of item (6) regarding the state of connection of the ground cable 69 with respect to the ground, terminal 68.

(8) The through hole 50 is formed in the middle portion of the support plate portion 47 in the radial direction of the peripheral wall portion 22. The ground terminal 67 is passed through the through hole 50 from the rear side to the front side (FIGS. 6 and 7).

Accordingly, the ground terminal 67 is arranged in the middle portion of the support plate portion 47 in the radial direction of the peripheral wall portion 22. This prevents the vibration damping structure for the steering wheel from being enlarged in the radial direction of the peripheral wall portion 22. As a result, the vibration damping structure is compact.

(9) The ground terminal 67 is formed integrally with the gas plate 61 (FIG. 8).

In other words, compare to a case in which the ground terminal 67 and the gas plate 61 are separate components, the number of the components decreases. This also makes it unnecessary to fix the ground terminal 67 to the gas plate 61.

(10) The ground terminal 67 is formed by bending the metal plate configuring the gas plate 61 (FIGS. 7 and 8).

Accordingly, the ground terminal 67 integral with the gas plate 61 is formed through simple machining, which is bending the metal plate.

The present invention may be embodied in the modified forms described below.

<Pressure Receiving Portion 66>

The pressure receiving portion 66 may be formed as a portion of the flange 24 of the inflator 21.

Figure 9:
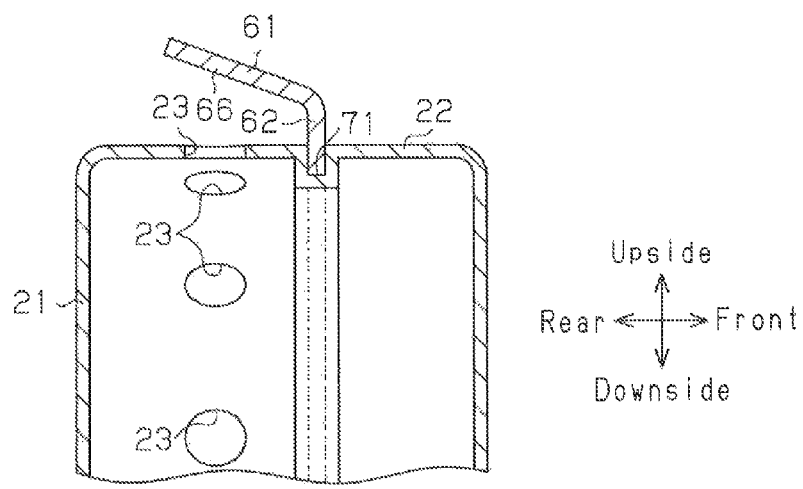
FIG. 9 is a cross-sectional view showing a portion of a modification of a pressure receiving portion.

The pressure receiving portion 66 may be attached directly to the inflator 21. An example of one such case is illustrated in FIG. 9, in which the interior of the inflator 21 is not shown for illustrative purposes. In this case, a recess 71, which has an opening facing outward in the radial direction of the peripheral wall portion 22, is formed in the peripheral wall portion 22 of the inflator 21 at a position forward (rightward as viewed in FIG. 9) to the gas ports 23. As illustrated in FIG. 9, for example, the recess 71 may be configured by a groove extending in a circumferential direction of the peripheral wall portion 22. The groove may extend along the entire circumference of the peripheral wall portion 22. Alternatively, although not illustrated, the recess 71 may be configured by a plurality of holes arranged at positions corresponding to the gas ports 23 and spaced apart in the circumferential direction of the peripheral wall portion 22. In these cases, the gas plate 61 having the pressure receiving portion 66 is received in (engaged with or pressed into) the recess 71 through the attachment base 62 to attach the pressure receiving portion 66 to the inflator 21.

The configuration of the pressure receiving portion 66 may be modified. However, in any modified forms, the pressure receiving portion 66 must be configured to change the flow direction of gas G, which is discharged outward from the gas ports 23 in the radial direction of the peripheral wall portion 22, to the direction toward the rear side and produce force F acting forward by receiving pressure from the gas G.

The pressure receiving portion 66 may be configured by, for example, a first wall portion and a second wall portion. The first wall portion is arranged at a position forward of the gas ports 23 and extends outward from the peripheral wall portion 22 in the radial direction of the peripheral wall portion 22 perpendicularly to the axis L1 of the inflator 21. The second wall portion extends from a radially outer edge of the first wall portion to a position rearward of the gas ports 23 in a state parallel to the axis L1. In this case, the gas G discharged outward from the gas ports 23 in the radial direction of the peripheral wall portion 22 hits the second wall portion. This changes the flow direction of the gas G and divides the gas G into a flow proceeding forward and a flow moving rearward. The gas G flowing forward is received by the first wall portion and the force F acting forward is produced by the first wall portion.

In the first and second embodiments, the pressure receiving portion 66 is inclined at a substantially uniform angle. However, the inclination angle of the inflator 21 may change gradually along the axis L1. Also, the pressure receiving portion 66 may be curved in a manner extended inward or outward in the radial direction of the peripheral wall portion 22 such that the pressure receiving portion 66 becomes more spaced, as a whole, from the peripheral wall portion 22 toward the rear end of the pressure receiving portion 66.

<Inflator 21>

The peripheral wall portion 22 of the inflator 21 may have any suitable shape other than the cylindrical shape.

<Elastic Support Portions 56>

The elastic support portions 56 may be arranged at positions in the support member 46 that are different from the positions of the elastic support portions 56 in the first and second embodiments. The number of the elastic support portions 56 in the support member 45 may also be changed.

The shape of each elastic support portion 56 is not restricted to the cylindrical shape but may be any other suitable shape, such as a hollow conical shape.

<Sealing Portion 57>

The sealing portion 57 may be formed in the inflator 21, instead of the support member 46. Alternatively, the sealing portion 57 may be arranged in both the inflator 21 and the support member 46. The sealing portion 57 formed in the inflator 21 may be an elastic member, for example, which is adhered to the front surface of the flange 24 as the sealing portion 57. The sealing portion 57 may be formed at any suitable position in the inflator 21 other than positions in the flange 24.

<Ground Terminal 67>

The ground terminal 67 may be configured by a component separate from the gas plate 61. In this case, a structure for fixing the ground terminal 67 to the gas plate 61 must be employed.

The ground terminal 67 may be arranged in the pressure receiving portion 66, instead of the attachment base 62.

The ground terminal 67 may be extended to the outer edge of the support plate portion 47. In this case, the through hole 50 in the support plate portion 47 is unnecessary.

When the state of connection of the ground path (the ground cable 69) with respect to the ground terminal 67 is inspected (confirmed) using a method other than visual inspection, the ground terminal 67 may be located at such a position that the ground terminal 67 is prevented from being exposed from the front surface of the steering wheel 10.

<Other Components>

At least one of the back holder 31, the cup retainer 41, the support plate portion 47, and the gas plate 61 may be formed through any suitable means other than press working, for example, through die casting.

The term "vehicle" herein refers to not only passenger vehicles and various types of industrial vehicles but also any type of passenger transport means. The term "vehicle" may include an aircraft or a ship, for example.

Therefore, the present examples and embodiments are to be considered as illustrative and not restrictive and the invention is not to be limited to the details given herein, but may be modified within the scope and equivalence of the appended claims.

The invention claimed is:

1. A vibration damping structure for a steering wheel using a dynamic damper, the vibration damping structure comprising:
    an airbag mounted in the steering wheel;
    an inflator arranged forward of the airbag, wherein the inflator has a peripheral wall portion and a plurality of gas ports formed in the peripheral wall portion, the inflator discharges gas from the gas ports outward in a radial direction of the peripheral wall portion to inflate the airbag rearward, and the inflator functions as a damper mass in the dynamic damper;
    a support member having an elastic support portion for elastically supporting the inflator at a position forward of the inflator, wherein the support member has a communication hole formed at a position facing the inflator, and the elastic support portion functions as a spring in the dynamic damper; and
    a sealing portion formed in at least one of the inflator and the support member to surround the communication hole, wherein the inflator contacts the support member at the sealing portion so that gas leakage via the communication hole is prevented,
    wherein a pressure receiving portion is joined integrally with the inflator at a position close to the gas ports of the inflator, and the pressure receiving portion changes a flow direction of the gas discharged outward from the gas ports in the radial direction of the peripheral wall portion to a direction toward a rear side and to produce force acting forward by receiving pressure from the gas.

2. The structure according to claim 1, wherein the pressure receiving portion is located close to the gas ports and outward of the gas ports in the radial direction of the peripheral wall portion.

3. The structure according to claim 2, wherein the pressure receiving portion is inclined to become more spaced from the peripheral wall portion toward a rear end of the pressure receiving portion.

4. The structure according to claim 2, wherein a back holder is mounted in the steering wheel, the airbag being fixed to the back holder at a position outward of the pressure receiving portion in the radial direction of the peripheral wall portion.

5. The structure according to claim 1, wherein
the elastic support portion is formed of elastic insulating material,
the pressure receiving portion is formed of conductive material as a portion of a gas plate mounted around the peripheral wall portion, and
the gas plate has a ground terminal, a ground path for releasing electric charge from the inflator being connected to the ground terminal.

6. The structure according to claim 5, wherein the ground terminal is exposed from a front surface of the steering wheel.

7. The structure according to claim 6, wherein
a through hole is formed in a middle portion of the support member in the radial direction of the peripheral wall portion, and
the ground terminal extends through the through hole from a rear side to a front side.

8. The structure according to claim 5, wherein the ground terminal is formed integrally with the gas plate.

9. The structure according to claim 8, wherein the ground terminal is formed by bending a plate material configuring the gas plate.

* * * * *